(12) United States Patent
Langseth et al.

(10) Patent No.: US 6,296,790 B1
(45) Date of Patent: Oct. 2, 2001

(54) METHOD OF PRODUCING MAGNESIUM CHLORIDE GRANULES

(75) Inventors: Birger Langseth; Arne Bent Frigstad, both of Porsgrunn; Leif Kåre Grønstad, Sannidal, all of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/284,181

(22) PCT Filed: Oct. 10, 1997

(86) PCT No.: PCT/NO97/00275

§ 371 Date: Apr. 9, 1999

§ 102(e) Date: Apr. 9, 1999

(87) PCT Pub. No.: WO98/16306

PCT Pub. Date: Apr. 23, 1998

(30) Foreign Application Priority Data

Oct. 11, 1996 (NO) ........................................... 964350

(51) Int. Cl.[7] ........................................... B29B 9/00
(52) U.S. Cl. .................. 264/12; 264/14; 423/498
(58) Field of Search .................. 264/5, 12, 13, 264/14; 423/498

(56) References Cited

U.S. PATENT DOCUMENTS

| 3,347,625 | 10/1967 | Kimberlin, Jr. et al. | 423/498 |
| 3,395,977 | 8/1968 | Nadler . | |
| 3,719,743 | 3/1973 | Simon et al. | 423/498 |
| 3,742,100 | * 6/1973 | Boyum et al. | 264/14 |

* cited by examiner

Primary Examiner—Mary Lynn Theisen
(74) Attorney, Agent, or Firm—Wenderoth, Lind & Ponack, L.L.P.

(57) ABSTRACT

A method of producing magnesium chloride granules with a particle size in the range from 0.4 to 3.0 mm suitable for fluidization, air drying and chlorinating to anhydrous state, by preparing a feed solution of $MgCl_2$ having a 30–55% by weight of $MgCl_2$, feeding the solution and keeping it at high temperatures from the feeding tank to the nozzles, atomisation of the feed solution into the bed of already dried particles by pressure or compressed air, passing preheated air upwardly through the bed, maintaining the particles in a fluidizing state and a bed temperature between 100–170° C., continuously recovering entrained particles in a cyclone, discharging magnesium chloride particles continuously, classifying discharged material and recycling of any undersized fraction and crushed oversize fraction together with fines from the cyclone to the fluid bed for further granulation.

7 Claims, 1 Drawing Sheet

METHOD OF PRODUCING MAGNESIUM CHLORIDE GRANULES

Figure 1:
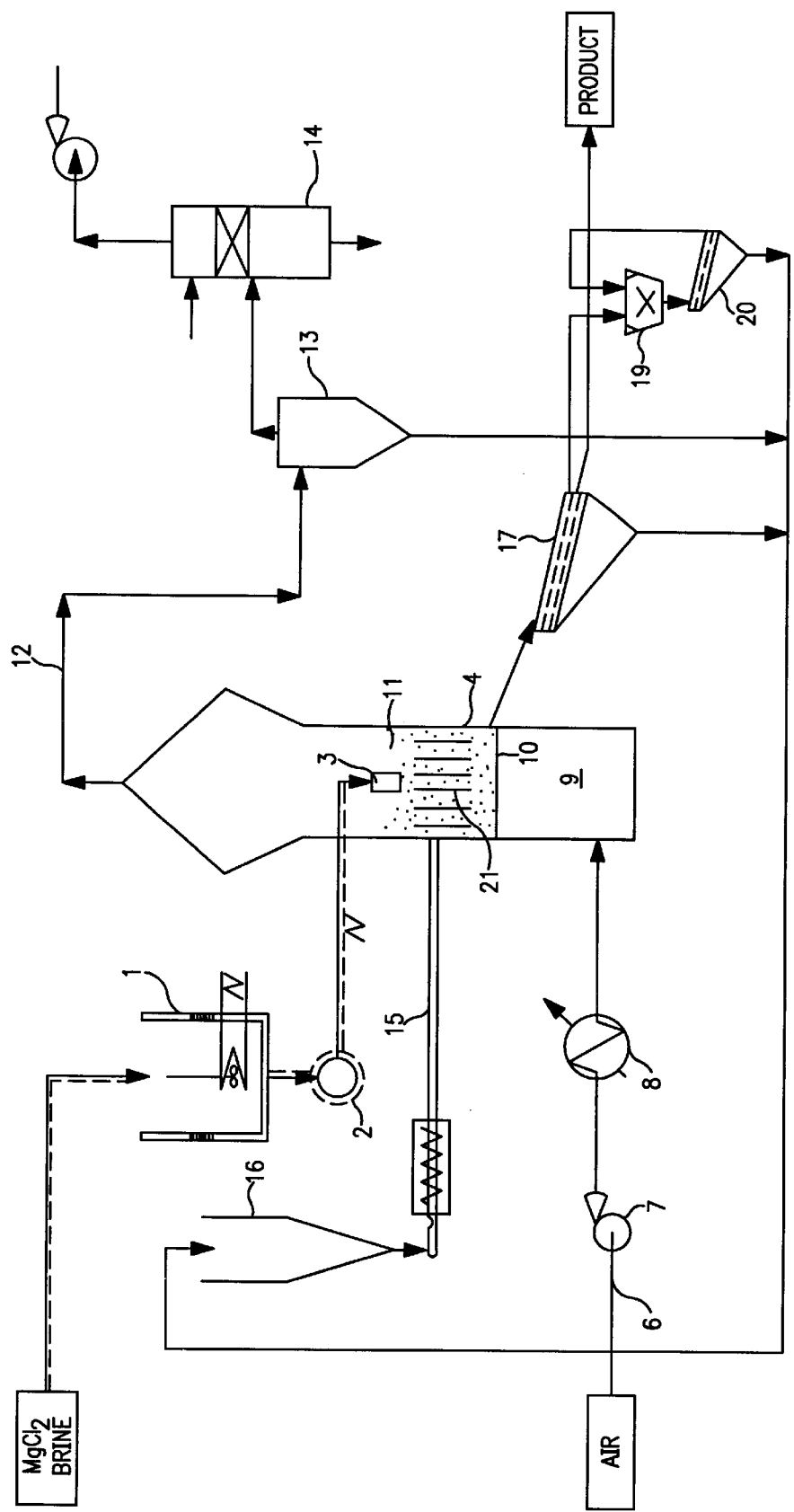

This application is a 371 application of International Application No. PCT/NO97/00275 filed Oct. 10, 1997.

The present invention relates to production of magnesium metal, and more particularly to production of anhydrous magnesium chloride particles from magnesium chloride brines, the particles being used as feed in an energy demanding process of electrolysis.

Several processes for producing anhydrous magnesium chloride prills are known, e.g. the process described in U.S. Pat. No. 3,742,100, comprising steps of:
a) Evaporation of brine to a concentration of 55% $MgCl_2$
b) Prilling the concentrated brine to form prills of $MgCl_2 \times 4$–$6\ H_2O$ with a particle size ranging from 0.5–1 mm
c) Two stage fluidized bed dehydration with air
d) Multistage fluidized bed dehydration with anhydrous HCl gas to give anhydrous magnesium chloride particles Such production of anhydrous magnesium chloride is, however, presently a capital intensive process, and consequently the object for the present invention is to reduce the investment and operating costs of the above steps b) and c), requiring a large amount of energy.

It is also known that similar granulation processes have been patented for different applications and described in the literature, but not specifically covering the present granulation of $MgCl_2$.

The above and other object(s) of the present invention are achieved by provision of a new, improved method of dehydration and granulation of $MgCl_2$ as claimed in claim 1.

Thus, the present invention provides a method of producing magnesium chloride granules with a particle size in the range from 0.4 to 3.0 mm suitable for fluidization, air drying and chlorinating to anhydrous state, the method comprising the steps of: preparing a feed solution of $MgCl_2$ having a 30–55% by weight of $MgCl_2$, feeding the solution and keeping it at high temperatures from the feeding tank to the nozzles, atomisation of the feed solution into the bed of already dried particles by pressure or compressed air, passing preheated air upwardly through the bed, maintaining the particles in a fluidizing state and a bed temperature between 100–170° C., continuously recovering entrained particles in a cyclone, discharging magnesium chloride particles continuously, classifying discharged material and recycling of any undersized fraction and crushed oversize fraction together with fines from the cyclone to the fluid bed for further granulation.

The feed solution is preferably at a temperature of the range of 120–200° C., and feed supply equipment is preferably heated with steam at temperatures in the range of 120–200° C.

The fluidized bed preferably comprises magnesium chloride particles with water content ranging from 1.5–4 mole $H_2O$/mole $MgCl_2$ and MgOHCl values in the range 1–5%.

The fluidizing air preferably has a velocity of 1–2 m/s and is, together with panels in the fluidized bed, preferably heated sufficiently to maintain the bed at a temperature within the range of 100–170° C., by indirect heating or electrical calorifiers in order to keep the humidity as low as possible.

Drying air is preferably used at as low humidity as possible.

The temperature of the feed is preferably controlled by using saturated steam with a saturation pressure that gives the desired steam temperature.

Heating panels are preferably installed inside the fluidizing layer.

According to the present invention a bed of hydrous magnesium chloride particles is fluidized at a temperature between 100° C. to 150° C., preferably between 120–130° C. The bed particles contain 1.5 to 4 moles $H_2O$ per mole $MgCl_2$. Preferably the particles should have a water content ranging from 2.7–2.9 moles $H_2O$ per mole $MgCl_2$. A feed solution of magnesium chloride is prepared in a concentration of 30–55%, and preferably in a concentration of 45–55%, weight % anhydrous magnesium chloride. It is more complicated to granulate $MgCl_2$ brine at higher concentrations, but the overall energy comsumption is reduced. The solution is delivered at its boiling point, which is in the range of 120–190° C. from the upstream equipment. The solution is injected into the fluidizing zone which can be done by nozzles from the bottom, top or side of the granulation bed in the fluidized zone. The last one is preferable. The nozzles are spraying downwards or upwards, downwards from the bed height level is preferable, but any height in the bed can be used. The solution may be dispersed by employing compressed air, preferably air at a pressure of 1–6 bar, and preferably at the same temperature as the feed, but preferably it is dispersed under pressure. Pressurised nozzles without air for dispersion at pressures as high as 60 bar (preferably 20–30 bar) can also be used here. Heat tracing of feed supply equipment such as pipes, valves and pumps to avoid solidification or freezing of brine due to temperature gradients, is required at high brine concentrations. The heat tracing can be done electrically, but preferably it is done by steam tracing. The bed is fluidized by preheated air passing through the bed and at sufficiently high temperature to maintain the bed between about 100–170° C., preferably between about 120–130° C. The fluidization inlet temperature is in the range between 180–400° C. but preferably 230–240° C. The exhaust gas passes through a fines-separator such as a cyclone dust collector, which removes entrained fines, and return them back into the granulation bed. Granules are continuously withdrawn from the fluid bed and the particles or the granules, with a range of particle size, are then subjected to screening or other classification means. Undersized particles or fines are returned to the bed for further granulation. Oversized particles are crushed and returned to the fluid bed or to the screen to thus provide a means of product control and a means of stabilising the performance of the fluid bed operation. Seed particles are continuously fed or recycled to the fluidized bed. The seed particles are a combination of fines collected in the dust collector, undersized and crushed oversized particles separated from the screen. Within the bed the seed particles, and any other formed particles in the bed, grow both by agglomeration and layering as a result of the of the incoming feed solution and the particular conditions existing in the bed. The particles grow and the size increases with the retention time in the bed. The process of this invention will produce free-flowing and dustfree granules. The particles also seem to be stronger and more resistant to attrition and breakage in downstream equipment making transportation and further processing easier. Particles produced by this process are also easier to dry further and the chlorinating properties are also better than for prills. The operating conditions may be varied in accordance with the present invention to obtain the desired result with respect to quality of the granules and energy requirement.

The invention will now be described in more details with reference to the drawing (FIG. 1) illustrating schematically a process line (circuit) suitable for production of anhydrous $MgCl_2$ according to the present invention. A feed tank 1 contains a heated solution of magnesium chloride brine which is transported by a pump 2 to the spray nozzles 3 where the solution is atomised into the fluidized zone 4, preferably by pressure nozzles. Two phase nozzles using compressed air with approximately the same temperature as the feed entering at 5 may also be used. The air is heated, e.g. by electrical calorifiers or indirect gas burner, in order to avoid humid air. Fluidizing air 6 is transported by a centrifugal fan 7 and electrically heated or indirect by heat exchangers if gas burners B are used to ensure that the bed of particles 4 is maintained in a temperature range of 100–170° C. The air enters a predistribution chamber 9 before a perforated plate 10 distributes the air uniformly through the fluid bed 11. The distance from the atomising nozzles 3 to the perforated plate 10 is adjustable, and the nozzles are positioned right above the fluidized layer or other suitable locations. From the fluid bed unit 1 the air entrained dust or fine particles are separated from the exhaust gas 12 in a cyclone 13 and returned to the fluid bed 11 for further granulation. The fine dust that not separates in the cyclone 13 is collected in a wet scrubber 14 and returned to the feed. Seeding particles are introduced by a screw feeder 15 from silo 16 and consist of recycled materials. From the powder outlet bed particles are transported to a screen 17 being classified into 3 fractions: an oversize fraction, a product fraction and an undersize fraction. The oversize fraction is sent to crusher 19. The crushed magnesium chlorides granules are then optimally classified in an additional screen classifier 20.

Oversized materials are recycled from the screen 20 to the crusher 19, and the fraction having a desirable particle size (max. 0.5 mm) is fed together with fines from the cyclone 13 and fines from the screen 17 to the screw feeder 16. If the outsized fractions from the screen 17 are not sufficient to form seed material for the fluid bed, a part of the product fraction may be added. If the amount of oversize and undersize fraction is higher than what Is required as seed a part may be added to the feed tank 1. Heating panels 21 may additionally be used for more energy effective heat input instead of heating of air alone.

EXAMPLE

A pilot plant similar to that shown on the drawing was built, and several granulation tests have been performed.

In the feed tank a solution of magnesium chloride brine was prepared from magnesium chloride prills, water and 32% HCl giving a solution of appr. 43% by weight of $MgCl_2$. The feed is at the boiling temperature of 150° C. Pipes, valves and the pump in the feed supply system are steam traced and preheated to the boiling temperature of the feed solution. The feed is atomised with two fluid nozzles positioned in the bed appr. 20 cm from the gas distributor 10 spraying upwards. The feed rate is adjusted to 300 kg/h. The fluidizing cross sectional area of the bed unit is 0.65 m². The velocity of the fluidizing air is 1.7 m/s and the inlet air is preheated to 200° C. to maintain a bed temperature of 125° C. Recycled materials is in an amount of 150 kg/h introduced through the inlet by a screw feeder.

The achieved test results indicate that the energy savings for the new process compared to the above mentioned process are 1.16 MWh/t Mg. The new process also permits the two unit operations b) and c) to be combined in one piece of equipment, and this will also result in a substantial reduction of investment costs for new installations. Also the step a) can be combined in this new process step, something which will however accidentally result in reduction of costs.

What is claimed is:

1. A method of producing magnesium chloride granules with a particle size in the range from 0.4 to 3.0 mm suitable for fluidization, air drying and chlorinating to anhydrous state, the method comprising preparing a feed solution of $MgCl_2$ having a 30–55% by weight of $MgCl_2$, feeding the solution and keeping it at a temperature in the range of 120–200° C. from a feeding tank to nozzles, atomizing the feed solution into a bed of already dried particles by pressure or compressed air, passing preheated air upwardly through the bed, maintaining the dried particles in a fluidizing state and a bed temperature between 100–170° C., continuously recovering entrained particles in a cyclone, discharging magnesium chloride particles continuously, classifying discharged material and recycling any undersized fraction and crushed oversize fraction together with fines from the cyclone to the bed for further granulation.

2. Method according to claim 1, wherein the feed supply equipment is heated with steam at temperatures in the range of 120–200° C.

3. Method according to claim 1, wherein the fluidized bed comprises magnesium chloride particles with water content ranging from 1.5–4 mole $H_2O$/mole $MgCl_2$ and MgOHCl values in the range 1–5%.

4. Method according to claim 1, wherein the fluidizing air has a velocity of 1–2 m/s and is, together with panels in the fluidized bed, heated sufficiently to maintain the bed at a temperature within the range of 100–170° C., by indirect heating or electrical calorifiers in order to keep the humidity as low as possible.

5. Method according to claim 1, using drying air at as low humidity as possible.

6. Method according to claim 1, wherein the temperature of the feed is controlled by using saturated steam with a saturation pressure that gives the desired steam temperature.

7. Method according to claim 1, where heating panels are installed inside the bed.

* * * * *